(No Model.) 2 Sheets—Sheet 2.
W. GRIBBEN & J. M. GAIGE.
FEED REGULATOR.
No. 477,327. Patented June 21, 1892.
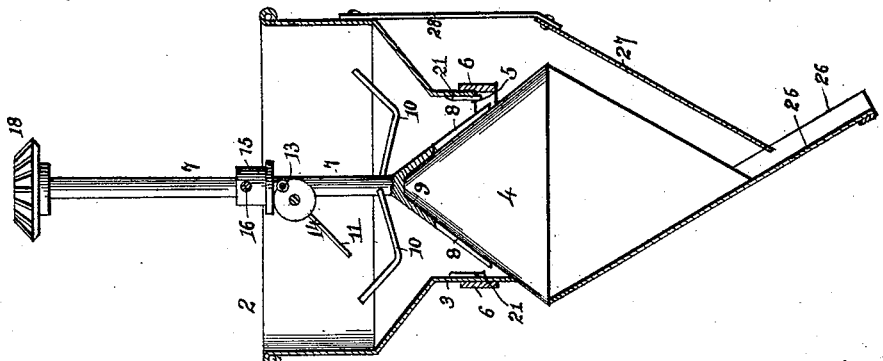
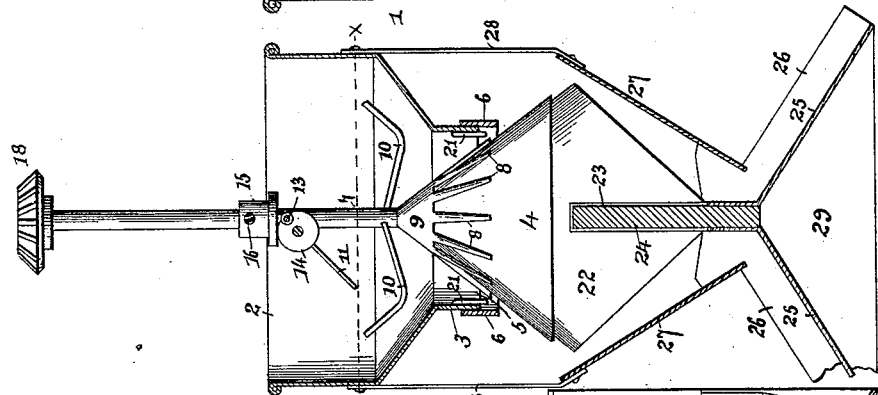
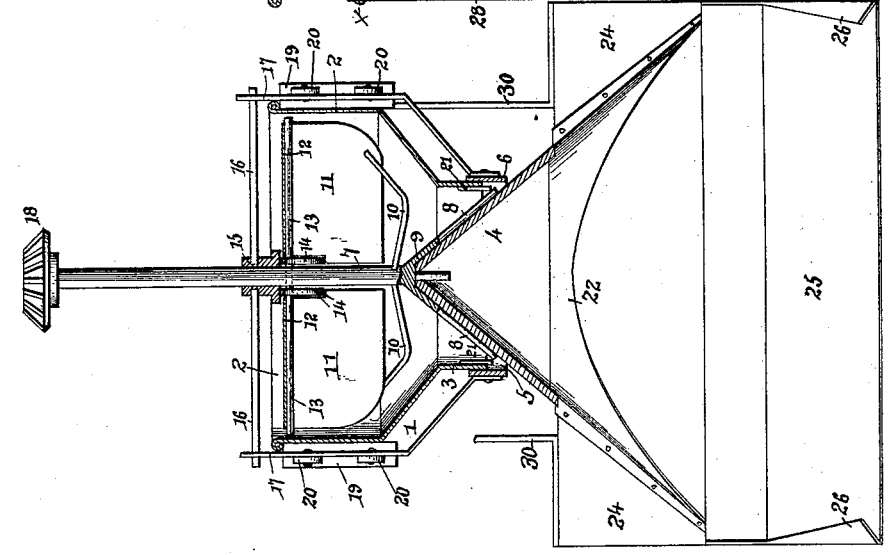
Witnesses
Jas. K. McCathran
H. T. Riley
Inventors
William Gribben
Joseph M. Gaige
By their Attorneys,
C. A. Snow & Co.

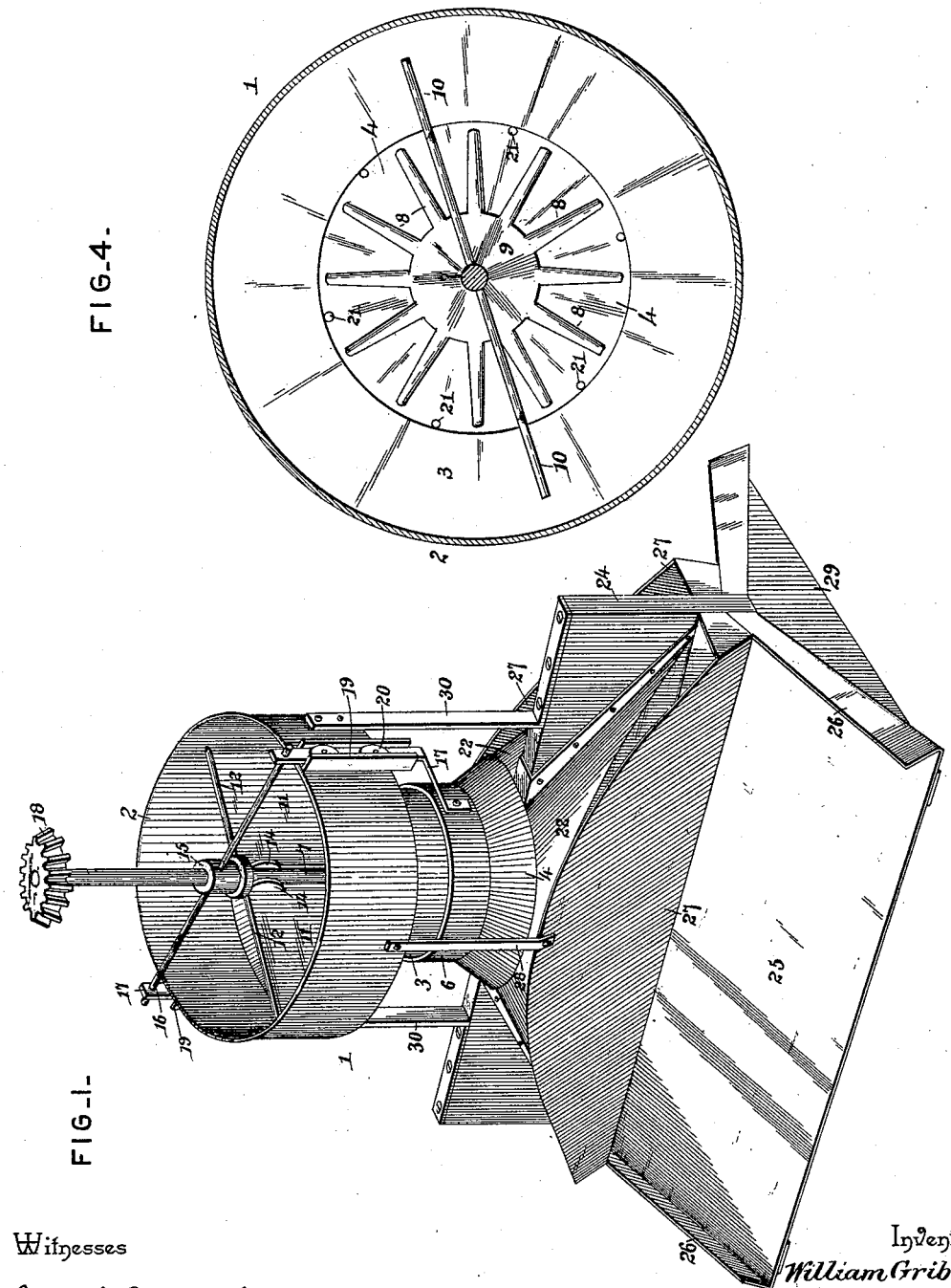

UNITED STATES PATENT OFFICE.

WILLIAM GRIBBEN AND JOSEPH M. GAIGE, OF CROSWELL, MICHIGAN.

FEED-REGULATOR.

SPECIFICATION forming part of Letters Patent No. 477,327, dated June 21, 1892.

Application filed December 1, 1891. Serial No. 413,697. (No model.)

*To all whom it may concern:*

Be it known that we, WILLIAM GRIBBEN and JOSEPH M. GAIGE, citizens of the United States, residing at Croswell, in the county of Sanilac and State of Michigan, have invented a new and useful Feed-Regulator, of which the following is a specification.

The invention relates to improvements in feed-regulators.

The object of the present invention is to simplify and improve the construction of feeding mechanism for roller-process flouring-mills and to enable the contents of a hopper to regulate the feed automatically, according to the bulk of material within the hopper.

The invention consists in the construction and novel combination and arrangement of parts hereinafter fully described, illustrated in the accompanying drawings, and pointed out in the claims hereto appended.

In the drawings, Figure 1 is a perspective view of a feeder constructed in accordance with this invention. Fig. 2 is a vertical sectional view of the same. Fig. 3 is a similar view taken at right angles to Fig. 2. Fig. 4 is a horizontal sectional view on line *x x* of Fig. 3. Fig. 5 is a vertical sectional view showing the feed-regulating mechanism applied to a single feeder.

Like numerals of reference indicate corresponding parts in all the figures of the drawings.

1 designates an approximately-conical hopper having an upper cylindrical portion 2 and a lower cylindrical portion 3, in which is arranged a conical distributer 4, which forms a circular feed-opening 5, adapted to be closed or partly closed by a collar or cut-off 6 to regulate the feed. The conical distributer 4 extends upward within the hopper and has centrally journaled in its apex a vertical shaft 7, carrying downwardly-extending radial fingers 8, formed integral with the conical body 9 and arranged on the outer face of the conical distributer to cause the material to pass through the circular feed-opening 5. The central shaft 7 is provided with agitator-arms 10, located above the fingers and adapted to stir the material thoroughly before the same passes to the conical distributer to prevent clogging.

In order to regulate the feed and adapt the feed-opening 5 to the quantity within the hopper, hinged blades 11 are arranged within the hopper and are connected with the collar or cut-off 6, so that when the material within the hopper raises or lowers the blades 11 the collar 6 will be correspondingly affected to increase or diminish the feed-opening. The blades 11 are provided at their upper edges with sleeves 12, which are arranged on a horizontal rod 13, centrally secured to the vertical shaft 7 and forming a support for the blades. Secured to each blade and sleeve is a disk 14, which is located at the inner end of the blade and is eccentrically arranged and forms a cam at each side of the blade. The disks support a sleeve 15, which is loosely mounted on the vertical shaft and is adapted to be raised and lowered by the swinging of the blades 11, and it is connected by horizontal rods 16 with vertically-disposed side rods 17, which have their lower ends attached to the collar 6 at diametrically-opposite points. When there is any material within the hopper, the rotation of the vertical shafts will cause the hinged blades to assume an inclined position, which will be greater or less according to the amount of the bulk of the material, and the blades in swinging in either direction will cause the cams formed by the disks to lift the sleeve 15 and open the feed-opening to a greater or less degree.

The rotation of the vertical shaft is effected by a suitable gearing (not shown) designed to mesh with a cog-wheel 18, arranged at the upper end of the vertical shaft. The side rods conform to the configuration of the hopper and are arranged on the outer sides of the same and are guided by parallel flanges 19. The flanges 19 are secured in pairs on the outer face of the hopper, and in order to prevent friction the side rods are provided with disks or rollers 20, arranged between the flanges. The radial fingers 8 operate in conjunction with vertical ribs 21, arranged at intervals on the inner face of the lower cylindrical portion 3 of the hopper.

The conical distributer is provided with laterally-extending portions 22, which are secured to the inner face of the distributer 4 and form continuations of the same and are provided with longitudinal slots or openings 23, through which extend the ends of a division-board 24 to direct the material coming through the feed-opening to one side of the hopper or the other. The material falls from the laterally-extending portion upon inclined deflectors 25, which are arranged below the laterally-extending portion and on opposite sides of the same and are adapted to direct the material to the rollers. The inclined deflectors are provided at their ends with flanges 26 to keep the material on the deflectors, and segmental guards 27 are provided to direct the material to cause the same to fall upon the inclined deflectors. The segmental guards 27 are arranged at the sides of the laterally-extending portions 22 and are secured to the ends of the inclined deflectors and are supported by hangers 28, depending from the hopper and secured to the upper edges of the segmental guards, which are inclined toward the deflectors. The division-board 24 is supported by triangular end pieces 29 and are connected with the hopper by L-shaped leaves or braces 30.

In the first four figures of the drawings the feeding mechanism is shown applied to a double feeder. In Fig. 5 the feeding mechanism is shown on a single feeder, such as is illustrated in Patent No. 443,139, and granted December 23, 1890, to W. Gribben.

From the foregoing description the construction, operation, and advantages of the invention will be readily understood.

What we claim is—

1. In a feeder, the combination of a hopper provided with a feed-opening, a cut-off arranged to regulate the size of the opening, a vertical shaft mounted in the hopper, a horizontal rod centrally secured to the vertical shaft, a sleeve loosely arranged on the shaft and connected with the cut-off and arranged above the horizontal rod, and hinged blades mounted on the horizontal rod and supporting the sleeve and adapted to raise and lower the same, whereby the cut-off will rise and fall, according to the bulk of the material within the hopper, substantially as described.

2. The combination, in a feeder, of a hopper provided with a feed-opening, a cut-off arranged to regulate the size of the opening, a vertical shaft mounted in the hopper, a sleeve loosely mounted on the shaft and connected with the cut-off, and the hinged blades carried by the shaft and provided with cams supporting the sleeve and adapted to cause the same to rise and fall, substantially as and for the purpose described.

3. In a feeder, the combination of a hopper provided with a feed-opening, a cut-off arranged to regulate the size of the opening, a vertical shaft mounted in the hopper, a horizontal rod centrally secured to the central shaft and extending therefrom, a sleeve loosely mounted on the shaft and connected with the cut-off, the blades provided at their upper edges with sleeves arranged on the horizontal rod, and the disks eccentrically secured to the inner ends of the blades and supporting the sleeve, substantially as described.

4. In a feeder, the combination of a hopper provided with a feed-opening and having a lower cylindrical portion 3, vertical ribs arranged at intervals on the cylindrical portion, a conical distributer, and a vertical shaft mounted in the hopper and carrying downwardly-extending radial fingers arranged on the outer face of the conical distributer, substantially as described.

5. In a feeder, the combination of a hopper provided with a feed-opening, a conical distributer, the laterally-extending portions 22, provided with longitudinal slots, the division-board extending through the slots, the inclined deflectors provided at their sides with flanges 26, the triangular end pieces supporting the division-boards and the deflectors, and the segmental guards inclined toward the deflectors, substantially as described.

In testimony that we claim the foregoing as our own we have hereto affixed our signatures in the presence of two witnesses.

WILLIAM GRIBBEN.
JOSEPH M. GAIGE.

Witnesses:
JOHN J. BINKS,
WILBOURN MILLS.